United States Patent [19]

Steer et al.

[11] Patent Number: 4,559,781
[45] Date of Patent: Dec. 24, 1985

[54] MASTER CYLINDER

[75] Inventors: John E. Steer, South Bend; Donald A. Crumb, Granger, both of Ind.

[73] Assignee: Allied Corporation, Morristown, N.J.

[21] Appl. No.: 546,774

[22] Filed: Oct. 31, 1983

[51] Int. Cl.[4] ............................................. B60T 11/20
[52] U.S. Cl. ....................................... 60/562; 60/578; 60/589; 277/207 R; 277/227
[58] Field of Search ................ 60/578, 589, 562, 574; 137/852, 860; 277/207 R, 227; 91/436

[56] References Cited

U.S. PATENT DOCUMENTS

| | | | |
|---|---|---|---|
| 2,185,072 | 12/1939 | Bowen | 60/578 |
| 3,029,480 | 4/1962 | Signorelli | 277/227 |
| 3,043,404 | 7/1962 | Péras | 137/852 |
| 4,099,380 | 7/1978 | Cadeddu | 60/589 |
| 4,329,846 | 5/1982 | Gaiser | |
| 4,441,320 | 4/1984 | Gaiser | 60/578 |
| 4,474,005 | 10/1984 | Steer | 60/589 |

FOREIGN PATENT DOCUMENTS

| | | |
|---|---|---|
| 0036253 | 9/1981 | European Pat. Off. . |
| 0059129 | 1/1982 | European Pat. Off. . |
| 2199068 | 4/1974 | France . |
| 8475 | 1/1978 | Japan ...................................... 60/578 |
| 31662 | 3/1980 | Japan ...................................... 60/578 |
| 502056 | 3/1939 | United Kingdom . |
| 48105 | 5/1981 | United Kingdom .................. 60/578 |

Primary Examiner—Abraham Hershkovitz
Attorney, Agent, or Firm—Leo H. McCormick, Jr.; Ken C. Decker

[57] ABSTRACT

A master cylinder includes a housing with a pair of pistons movable therein to develop fluid pressure in a pair of pressure chambers. One of the pistons carries a seal assembly in order to provide a fast-fill feature. The seal assembly engages a large diameter section during initial braking and separates therefrom after a predetermined fluid pressure level is reached so that the one piston moves relative to a small diameter section to continue fluid pressure buildup during braking.

6 Claims, 2 Drawing Figures

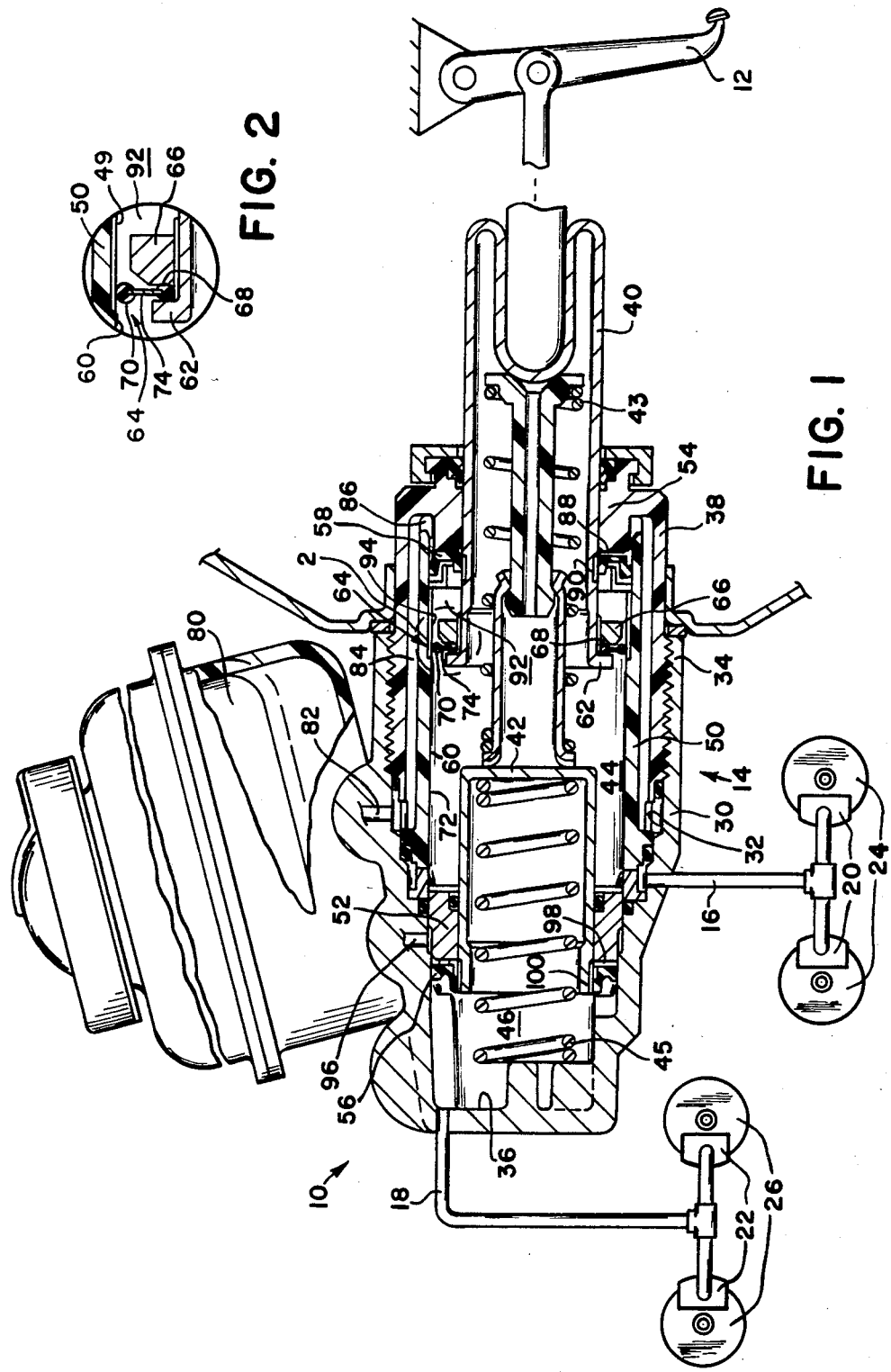

MASTER CYLINDER

The invention relates to a master cylinder wherein fluid pressure is developed during two stages of operation. Initially fluid pressure is generated across a large diameter section and above a predetermined fluid pressure level fluid pressure is generated across a small diameter section.

In a fast-fill master cylinder a housing forms a stepped bore to movably receive a stepped piston in a small diameter section and a large diameter section. Another piston is movably received in only the small diameter section. With the stepped piston movably engaging both diameter sections, the stepped bore and stepped piston require accurate machining to accommodate concentricity for the bore and stepped piston. Consequently, strict tolerances are required so that the machinery and controls used during production will provide a stepped piston which freely slides and moves within the stepped bore.

The present invention teaches a fast-fill master cylinder which alleviates the above critical manufacturing requirements. The invention is defined by a master cylinder comprising a pair of pistons movably disposed within a housing bore to generate fluid pressure within a pair of pressure chambers during braking, one of the pair of pistons substantially closing an open end of the housing bore and cooperating with the other piston to substantially define one of the pair of pressure chambers, the other piston cooperating with a closed end of the housing bore to define the other pressure chamber, the one piston engaging and cooperating with a first seal assembly at a large diameter section of said housing bore to generate fluid pressure during braking and the one piston engaging and cooperating with a second seal assembly at a small diameter section of said housing to generate fluid pressure during braking characterized in that said first seal assembly defines a first mode of operation to generate fluid pressure across the large diameter section and said first seal assembly is pressure responsive to the fluid pressure generated in said one pressure chamber to define a second mode of operation wherein fluid pressure generated in the one pressure chamber is independent of said first seal assembly.

It is an advantage of the invention that the first seal assembly can accommodate eccentricities between the large diameter section and the one piston and still provide a fast-fill feature for the master cylinder described herein.

FIG. 1 shows a brake system with a master cylinder in cross-section constructed in accordance with the present invention.

FIG. 2 is an enlarged view of the encircled portion of FIG. 1.

The brake system 10 includes a brake pedal 12 coupled to a master cylinder 14 in order to generate fluid pressure in the master cylinder 14 and communicate the same via conduits 16 and 18 to respective brake cylinders 20 and 22 for sets of wheel assemblies 24 and 26.

The master cylinder 14 includes a housing 30 with a bore 32 leading from an open end 34 to a bottom wall 36. A bearing 38 is threadably coupled to the open end 34 of the master cylinder. A pair of pistons 40 and 42 are movably disposed within the bore 32. The piston 40 extends outwardly of the housing to connect via suitable means with the pedal 12. The piston 40 cooperates with the piston 42 and the wall of bore 32 to form a primary pressure chamber 44 while the piston 42 cooperates with the wall of bore 32 to form a secondary pressure chamber 46. The conduit 16 communicates with the primary pressure chamber 44 and the conduit 18 communicates with the secondary pressure chamber 46. A pair of springs 43 and 45 cooperate with the pistons 40 and 42 to bias the latter to their rest positions.

The housing 30 includes a sleeve 50 retained in the bore 32 by the bearing member 38. The sleeve defines a small diameter section 52 at the piston 42 to support the latter for movement in the bore. The bearing member 38 also defines a small diameter section 54 equal in dimension to small diameter section 52. Both small diameter sections 52 and 54 support stationary seal assemblies 56 and 58 engageable respectively with pistons 42 and 40. The sleeve 50 defines a large diameter section 60 extending axially from the section 52 to the section 54.

The piston 40 extends into the sleeve 50 and terminates in an end flange 62. A seal assembly 64 is carried by the piston 40 at the end flange. A stop 66 is fixedly attached to the piston to retain the seal assembly on the piston 40. The seal assembly 64 includes an inner O-ring seal 68 engaging the piston 40, an outer O-ring seal 70 engageable with the inner wall 72 of sleeve 50 and a spring-like web 74 connecting the seals 68 and 70. The stop 66 is contoured away from the outer O-ring seal 70 so that movement of the O-ring seal 70 in the direction of seal assembly 58 is limited by the stop 66 in a manner hereinafter described.

In order to communicate fluid to the bore 32, a reservoir 80 carries fluid for communication with an inlet 82. The sleeve 50 cooperates with the bearing member 38 to form a passage 84 communicating fluid to the end of the sleeve 50 adjacent bearing section 54. A slot 86 at the end of the sleeve communicates the passage 84 to a groove 88 between the seal assembly 58 and the bearing section 54. The groove 88 comprises a fluid passage between the slot 86 and a recess 90. The recess 90 on the piston 40 communicates the radial groove 88 to an intermediary chamber 92 and a recess 94 on the sleeve 50 communicates the intermediary chamber 92 with the primary pressure chamber 44. An inlet 96 communicates the reservoir 80 with the secondary pressure chamber 46 via groove 98 and recess 100 on the end of piston 42. The groove 98 comprises a fluid passage between the inlet 96 and the recess 100.

In the rest position illustrated for the master cylinder 14, return spring 43 positions the recess 90 on piston 40 adjacent the seal assembly 58 and the O-ring seal 70 adjacent the recess 94. The piston 42 positions the recess 100 adjacent the radial groove 98. Consequently, fluid is freely communicated from the reservoir 80 to the pressure chambers 44 and 46 in the rest position. During a brake application, the piston 40 is moved into the bore 32 to close the recess 90 from the radial groove 88. At the same time, the O-ring seal 70 is moved away from recess 94 to sealingly move along the wall of diameter section 60. Fluid trapped in the primary pressure chamber 44 is pressurized as a function of volume contraction measured across diameter section 60. At the same time the intermediary chamber 92 is expanding and fluid from the reservoir is free to communicate with and maintain fluid in the expanding intermediary chamber. When the fluid pressure in the primary pressure chamber is above a predetermined value, the seal assembly 64 is deformable to permit the O-ring seal 70 to move toward the seal assembly 58. The spring-like web 74 is deformed to allow the O-ring seal 70 to move toward the stop 66 and out of sealing engagement with the wall 72 of sleeve 50. Fluid in chamber 44 will not flow to the intermediary chamber 92 because the latter chamber has been continually replenished as it expanded. Continued movement of the piston 40 will contract the volume of fluid in the primary pressure chamber 44 as a function of volume contraction measured across diameter section 54. Consequently, during initial braking, fluid is communicated to the conduit 16 as a function of the large diameter section 60 in order to provide a "fast-fill" type master cylinder. Above the predetermined fluid pressure level, the fluid pressure developed is a function of the small diameter section 54.

Throughout braking, the spring 43 is contracted to impart movement to piston 42 and the fluid pressure in the chamber 44 acts against the piston 42 to further bias the latter to move and develop fluid pressure in secondary pressure chamber 46 and conduit 18. In addition, at full braking or static conditions the spring-like web 74 biases the O-ring seal 70 into engagement with the wall 72.

Upon termination of braking, the springs 43 and 45 bias the pistons to return to their rest positions. The fluid flow from chamber 92 to chamber 44 biases the O-ring seal 70 to move away from wall 72 in the direction of piston 42 and does not restrict fluid flow. In the rest position the spring-like web 74 positions the O-ring seal 70 as shown in the Figures.

In view of the above description, the seal assembly 64 provides a fast-fill feature with a controlled initial stage of fluid pressure build up as a function of the large diameter section 60 and the inherent resiliency of spring-like web 74. The large diameter section 60 is in front of the small diameter section 54 and the O-ring seal 70 of seal assembly 64 is sufficiently deformable to sealingly engage the wall 72 of large diameter section 60 regardless of slight variations in the concentricity of piston 40 and sleeve 50.

We claim:

1. A master cylinder having a pair of pistons movably disposed within a housing bore to generate fluid pressure within a pair of pressure chambers during braking, one of the pair of pistons substantially closing an open end of the housing bore and cooperating with the other piston to substantially define one of the pair of pressure chambers, the other piston cooperating with a closed end of the housing bore to define the other pressure chamber, the one piston cooperating with a first seal assembly at a large diameter section of said housing bore to generate a first fluid pressure during a first operational mode of braking and cooperating with a second seal assembly at a small diameter section of said housing to generate a second fluid pressure during a second operational mode of braking, said first seal assembly comprising:

an inner O-ring radially connected to said one piston;
an outer O-ring seal radially connected to said inner O-ring seal by a resilient web; and
a stop member carried by said one piston, said outer O-ring on movement of said one piston in response to an input force engaging said large diameter section of said housing during said first operational mode and with said one piston creating said first fluid pressure, said first fluid pressure acting on and overcoming said resilient web to move said outer O-ring seal out of engagement with said large diameter section and into engagement with said stop and thereafter allow further movement of said one piston with respect to said second seal assembly to create said second fluid pressure, said resilient web on termination of said input force and during the return of said one piston toward a rest position moving said outer O-ring seal out of engagement with said stop and back to a substantially radial position.

2. The master cylinder of claim 1 in which said first seal assembly is axially disposed within said housing between said other piston and said second seal assembly.

3. The master cylinder of claim 1 in which said one piston is provided with an end flange extending radially outwardly and said stop cooperates with said end flange to position said first seal assembly on said one piston.

4. The master cylinder of claim 1 in which said housing defines a first relief cooperating with said first seal assembly in a rest position for said one piston to communicate fluid past said first seal assembly, said one piston defines a second relief cooperating with said second seal assembly in the rest position for said one piston to communicate fluid from a reservoir to the one pressure chamber.

5. The master cylinder of claim 1 in which said first seal assembly is carried by one piston at a leading edge of the latter closest to the other piston.

6. The master cylinder of claim 1 in which said one piston includes:

a first recess that allows fluid to be communicated to an intermediate chamber from a reservoir with the one piston in the rest position, said intermediate chamber being connected to said one pressure chamber by way of a second recess between said outer O-ring and said large diameter section, said one piston on moving terminating fluid communication through said first and second recesses to allow the creation of said first fluid pressure.

* * * * *